United States Patent [19]

Niles et al.

[11] Patent Number: 4,535,432
[45] Date of Patent: Aug. 13, 1985

[54] DEVICE FOR CLEANING A PHONOGRAPH RECORD

[75] Inventors: Gerald J. Niles; Thomas A. Sandberg, both of St. Paul, Minn.

[73] Assignee: Minnesota Mining and Manufacturing Company, Saint Paul, Minn.

[21] Appl. No.: 585,346

[22] Filed: Mar. 1, 1984

[51] Int. Cl.³ .............................................. G11B 3/58
[52] U.S. Cl. .................... 369/72; 15/1.5 A; 15/DIG. 14
[58] Field of Search ......... 369/72; 15/1.5 A, DIG. 14

[56] References Cited

U.S. PATENT DOCUMENTS 3,355,177 11/1967 King ...................................... 369/72
4,166,626 9/1979 Sandor et al. .......................... 369/72
4,378,597 3/1983 Tsutsui et al. ......................... 369/72

*Primary Examiner*—Steven L. Stephan
*Attorney, Agent, or Firm*—Donald M. Sell; James A. Smith; William L. Huebsch

[57] ABSTRACT

A device of the prior art has an elongated arm, on the underside of which is a porous cleaning pad that cleans a phonograph record when the arm is rotated around the record. The novel device is similar, but has a small reservoir pivotably mounted in the handle. To use the novel device, one fills the reservoir with cleaning fluid and pivots it to dump the fluid which saturates the cleaning pad. Then one rotates the arm to clean the record, repeating this procedure for each record side to be cleaned.

20 Claims, 5 Drawing Figures

DEVICE FOR CLEANING A PHONOGRAPH RECORD

TECHNICAL FIELD

The invention concerns a device for cleaning a phonograph record and desirably also lubricating and eliminating static from the playing surface.

BACKGROUND ART

While it is quite common to clean phonograph records with brushes and cloths, a more convenient cleaning device of U.S. Pat. No. 4,166,626 (Sandor et al.) has been on the market for several years. The Sandor device comprises an elongated arm, one end of which is formed to engage the spindle of a phonograph turntable. When so engaged, an elongated porous cleaning pad mounted on the underside of the arm extends radially across the working surface of a record on the turntable. A bottle of cleaning fluid is rotatably connected to the arm.

To clean a record, the bottle is briefly depressed to open a valve in a cylindrical housing which is integral with the arm. This allows cleaning fluid to flow into the porous cleaning pad. Then while using the bottle as a handle, the arm is rotated around the record. As suggested in the Sandor patent, the cleaning fluid preferably includes a lubricant and an anti-static agent.

The Sandor device haphazardly supplies cleaning fluid to the porous pad, and the portion of the pad immediately beneath the bottle is quickly saturated. The fluid tends to leak both through and around that portion of the pad before reaching its radially outward extremity. This is both messy and wastes the fluid. Furthermore, the difficulty of saturating the radially outer extremity of the porous cleaning pad leaves some records poorly lubricated at their outer grooves where lubricant is most needed. The Sandor device is rather expensive to manufacture and assemble and so has been sold at a price higher than many potential customers are willing to pay, considering its shortcomings.

DISCLOSURE OF INVENTION

The cleaning device of the present invention is similar to that of Sandor in having an elongated arm, one end of which is formed to engage a phonograph spindle, an elongated porous cleaning pad on the underside of the arm, which pad extends radially across the working surface of a record when positioned for cleaning, a rotatable member carried by the upperside of the arm, and a cleaning-fluid reservoir carried by the rotatable member. Also as in the Sandor device, the rotatable member and arm together form a fluid passage from the reservoir to the cleaning pad. As compared to the Sandor device, the cleaning device of the invention can be manufactured and assembled at less cost and distributes the cleaning fluid, including any libricant and anti-static agent, more uniformly over the full length of the porous cleaning pad and with less waste. The novel cleaning device achieves these important results in that the fluid capacity of each of its reservoir and its cleaning pad barely wets one entire working surface of the largest record to be cleaned (with due regard to evaporative losses), and the reservoir is pivotably mounted in the rotatable member and pivots to dump its contents onto the pad.

Like the device shown in the Sandor patent, the novel device preferably has a hollow cylindrical housing or wall projecting upwardly from the arm, with the aforementioned rotatable member mounted at an open end of the cylindrical wall. Unlike the Sandor device, the rotatable member of a preferred device of the invention is shaped as a handle. Like the Sandor device, the novel device may include a perforated rigid carrier for the cleaning pad. Unlike that of Sandor, a preferred device of the invention includes a continuous rib which projects downwardly from the arm and abuts and forms with the carrier a basin for fluid dumped from the reservoir, so that all fluid dumped from the reservoir flows through the perforations of the carrier into the cleaning pad.

The carrier of a preferred device of the invention is a V-shaped plate, the apex of the V pointing downwardly and extending the full length of the plate. The plate is perforated along the apex of the V, but has an imperforate area adjacent the outlet of the aforementioned fluid passage which extends from the reservoir through the handle and arm. By uniformly spacing the perforations between that outlet and the ends of the plate, fluid dumped from the reservoir tends to saturate the cleaning pad simultaneously over its entire length. Best results have been obtained when the perforations together are sufficient to pass the fluid capacity of the reservoir in two seconds.

The cleaning pad of the device should be protected by a rigid storage tray into which the arm fits. Each of the arm, handle, reservoir and storage tray may be molded of the same plastic using a single tool set. The plastic should be both solvent and impact resistant. Especially suitable is a blend of a major proportion of ABS and a minor proportion of polyvinyl chloride such as Mobay-89020. The carrier plate for the cleaning pad preferably is aluminum. The cleaning pad preferably comprises a flexible, open-cell foam core and an exterior fabric convering which should be a cut-pile fabric having a free fiber length exceeding the maxium depth of the grooves of a phonograph record.

DETAILED DESCRIPTION

Figure 3:
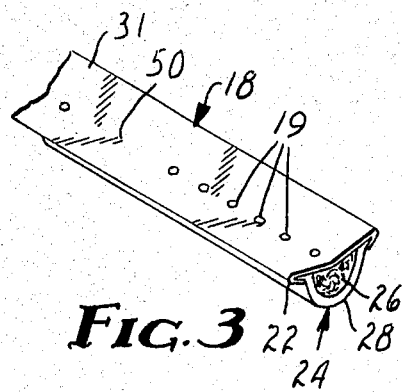
FIG. 3 is a perspective view of the rigid perforated carrier and cleaning pad of the cleaning device of FIGS. 1-2.
Figure 1:
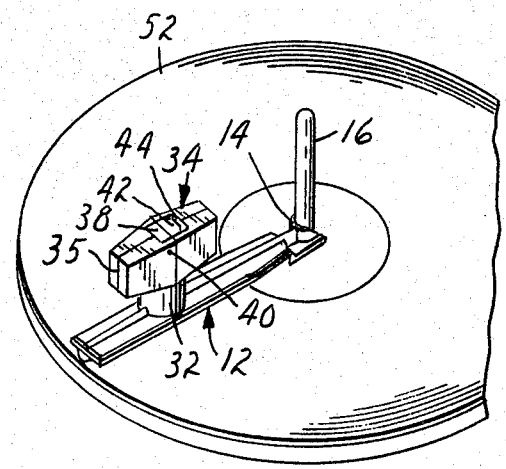
FIG. 1 is a schematic perspective view of a preferred cleaning device of the invention in position for cleaning a phonograph record.
Figure 2:
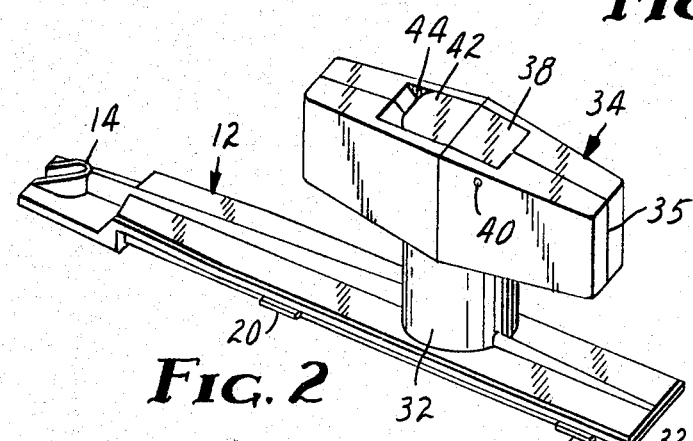
FIG. 2 is an enlarged schematic perspective view of the cleaning device of FIG. 1.

The cleaning device shown in FIGS. 1-5 comprises an elongated plastic arm 12, one end 14 of which is formed to engage a spindle 16 of a phonograph. A V-shaped aluminum carrier (FIG. 3) 18 is formed with perforations 19 at the apex of its V. The carrier 18 is releasably secured to the underside of the arm 12 by four T-shaped projections 20 formed in the arm. The elongated edges 22 of the carrier 18 are folded over the edges of a porous cleaning pad 24 which consists of flexible, open-cell plastic foam core 26 such as polyurethane foam and an exterior, cut-pile fabric 28, the individual fibers of which are greater in length than the maximum depth of the grooves of a phonograph record. A preferred cut-pile fabric is velour. A continuous rib 30 integral with and projecting from the underside of the arm 12 abuts with upper face 31 of the carrier 18 along the entire length of the rib. The rib and upper carrier face together form a basin encompassing all of the perforations 19.

Projecting from the upperside of the arm 12 is an integral hollow cylindrical wall 32 on which a hollow plastic handle 34 is rotatably mounted. The handle is molded in two parts which snap together along a fluid-tight parting line 35. The handle 34 includes a cylindrical projection 36, the outer surface of which continues the cylindrical surface of the hollow wall 32. A cup-like reservoir 38 is pivotably mounted by a steel pin 40 at the top of the handle 34. An elongated wall 42 of the reservoir closes the top of the handle when the reservoir is in the dumping position (solid lines of FIG. 4). A recess 44 in the top of the handle 34 permits one's finger to pivot the reservoir to its upright position (dotted lines of FIG. 4) for filling. The fluid capacity of each of the reservoir 38 and the cleaning pad 24 should barely wet out the entire working surface of the largest record to be cleaned, allowing for evaporative losses. At the present time, the largest record in widespread commercial use has a diameter of 12 inches (30 cm), and a reservoir which holds 1.0 ml enables its entire working surface to be wet with cleaning fluid. The fluid capacity of the cleaning pad 24 also is preferably 1.0 ml.

Within the handle 34 and the elongated arm 12 is a fluid passage for conveying cleaning fluid dumped from the reservoir 38 to the porous cleaning pad 24. Upon emerging from the outlet of the fluid passage at 48, the cleaning fluid strikes a central imperforate area 50 of the V-shaped carrier 18 and then flows laterally and through the perforations 19 which are uniformly spaced between the imperforate area 50 and the ends of the carrier 18. The rib 30 acts as a dam so that all of the fluid passes through the perforations. Because of the open-cell structure of the foam 26, it is quickly saturated. One then uses the handle 34 to rotate the arm 12 around a phonograph record 52 (FIG. 1), and the individual fibers of the cut-pile fabric 28 wick the cleaning fluid into each groove of the record.

To clean a second phonograph record side, one again lifts the reservoir 38 to its upright position, fills it with cleaning fluid, dumps the contents, and uses the handle 34 to rotate the elongated arm 12 around the record.

Figures 4, 5:
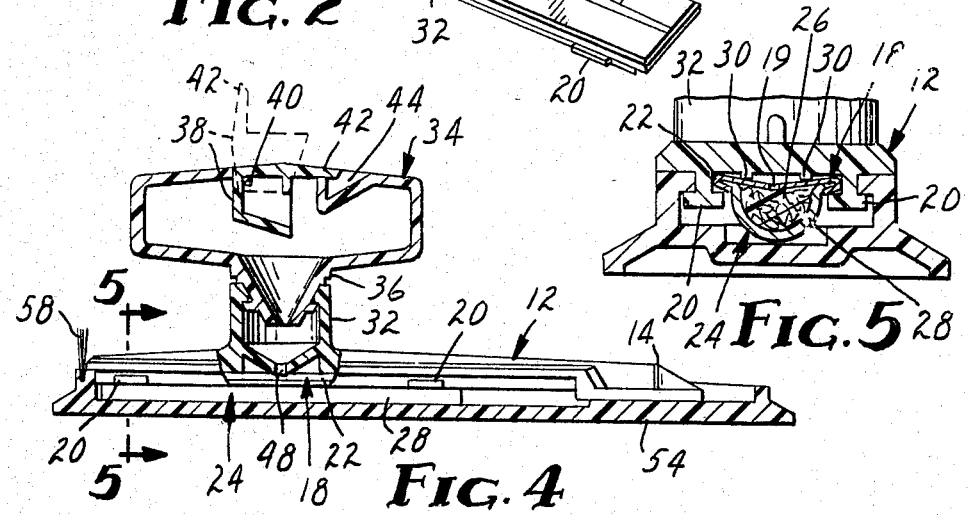
FIG. 4 is a plan view, partly cut away to a central section of the cleaning device of FIGS. 1 and 2 mounted in a storage tray.
FIG. 5 is a cross-section along line 5—5 of FIG. 4.

When the cleaning has been completed, the cleaning device is fitted into a storage tray 54 as shown in FIG. 4, thus keeping its fabric 28 clean. The storage tray 54 is formed with slots into which the T-shaped projections 20 fit to lock the arm to the tray. Conveniently, the tray 54 includes a bristle-type brush 58 which may be used from time to time to restore the nap of the fabric 28.

A preferred cleaning fluid comprises by weight 80 parts of a fast-evaporating fluorocarbon such as "Freon TF", 15 parts of isopropyl alcohol and 5 parts of heptane plus small amounts of an anti-static agent and a lubricant totaling about 0.25 part. Preferred anti-static agents and other cleaning fluids are disclosed in U.S. Pat. No. 4,313,978 (Stevens et al. ). The cleaning fluid may also contain a fluorinated surfactant as suggested in that patent.

It is believed that little more than one-half of 1.0 ml fluid capacity of the reservoir 38 actually reaches the record face, and that most of the remaining cleaning fluid evaporates from the cleaning pad while a second record side is being positioned for cleaning. When using the preferred cleaning fluid mentioned above to clean one side of a 12-inch (30-cm) record, its entire working surface becomes wet in one rotation. If the arm is again rotated without refilling the reservoir, the cleaning fluid which was applied during the first pass evaporates and the working surface of the record becomes only partially wet during the second pass.

We claim:

1. A phonograph-record cleaning device comprising an elongated arm, one end of which is formed to engage the spindle of a phonograph tuntable, an elongated porous cleaning pad mounted on the underside of the arm and extending radially across the working surface of a record when positioned for cleaning, a rotatable member carried by the upperside of the arm, a cleaning-fluid reservoir carried by the rotatable member, and the rotatable member and arm together forming a fluid passage from the reservoir to the cleaning pad, wherein the improvement comprises:

the fluid capacity of each of the reservoir and pad barely wets one entire working surface of the largest record to be cleaned, and the reservoir is mounted in the rotatable member for pivotable movement between a fill position affording manual filling of the reservoir, and a dump position at which the contents of the reservoir will be poured onto the porous cleaning pad.

2. Cleaning device as defined in claim 1 having a hollow cylindrical wall projecting upwardly from the arm, the rotatable member being mounted at the open end of the cylindrical wall, wherein the further improvement comprises:

the rotatable member is shaped as a handle.

3. Cleaning device as defined in claim 2 wherein the handle includes a cylindrical projection, the outer surface of which continues the a cylindrical surface of the hollow wall.

4. Cleaning device as defined in claim 1 which further comprises a perforated rigid carrier for the porous cleaning pad, wherein the further improvement comprises:

a continuous rib projecting from the underside of the arm abuts and forms with said carrier a basin for fluid dumped from the reservoir.

5. Cleaning device as defined in claim 4 wherein said carrier is a V-shaped plate, the apex of the V pointing downwardly and extending the length of the plate.

6. Cleaning device as defined in claim 5 wherein perforated along the apex of the V.

7. Cleaning device as defined in claim 6 wherein the plate is imperforate adjacent the outlet of said fluid passage.

8. Cleaning device as defined in claim 7 wherein the perforations in the plate are uniformly spaced between its imperforate area and the ends of the carrier.

9. Cleaning device as defined in claim 8 wherein the perforations together are sufficient to pass the fluid capacity of the reservoir within two seconds.

10. Cleaning device as defined in claim 9 wherein the lengthwise edges of the carrier are folded over the edges of the porous cleaning pad to fasten the pad to the carrier.

11. Cleaning device as defined in claim 10 wherein the porous cleaning pad comprises a flexible open-cell foam core and a cut-pile fabric covering.

12. Cleaning device as defined in claim 11 wherein the fabric covering is velour.

13. Cleaning device as defined in claim 11 wherein the foam core is polyurethane.

14. Cleaning device as defined in claim 1 wherein each of the rotatable member, reservoir and arm is a piece of molded plastic which is impact and solvent resistant.

15. Cleaning device as defined in claim 14 wherein the rotatable member is shaped as a handle.

16. Cleaning device as defined in claim 15 wherein a metal pin pivotally attaches the reservoir to the handle, and the reservoir is pivotable between an upright position for retaining its full fluid capacity and a lateral position for dumping its entire fluid contents.

17. Cleaning device as defined in claim 16 wherein the reservoir has an elongated wall which closes the top of the handle when the reservoir is in the dumping position, and the top of the handle is formed with a recess at the end of the elongated wall in the closed position to permit one's finger to pivot the reservoir to its upright position for filling.

18. Cleaning device as defined in claim 1 further including a storage tray into which the arm fits to protect the porous cleaning pad.

19. Cleaning device as defined in claim 18 wherein the storage tray is formed with slots and the arm is formed with projections which fit into the slots to lock the arm to the tray.

20. Cleaning device as defined in claim 19 wherein a brush for cleaning the pad projects upwardly from the storage tray.

* * * * *